US008953520B2

(12) United States Patent
Attar et al.

(10) Patent No.: US 8,953,520 B2
(45) Date of Patent: Feb. 10, 2015

(54) METHOD AND APPARATUS FOR INTER-SECTOR MIMO

(75) Inventors: Rashid Ahmed Akbar Attar, San Diego, CA (US); Radhika Gowaikar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 961 days.

(21) Appl. No.: 12/704,980

(22) Filed: Feb. 12, 2010

(65) Prior Publication Data

US 2010/0265883 A1  Oct. 21, 2010

Related U.S. Application Data

(60) Provisional application No. 61/152,422, filed on Feb. 13, 2009.

(51) Int. Cl.
| | | |
|---|---|---|
| H04W 4/00 | (2009.01) | |
| H04L 1/06 | (2006.01) | |
| H04B 1/7107 | (2011.01) | |
| H04L 1/00 | (2006.01) | |

(52) U.S. Cl.
CPC ............. *H04L 1/06* (2013.01); *H04B 1/71072* (2013.01); *H04L 1/0047* (2013.01); *H04B 2201/70702* (2013.01)
USPC ......................................................... 370/328

(58) Field of Classification Search
USPC .......................................... 370/328; 375/260
See application file for complete search history.

(56) References Cited

U.S. PATENT DOCUMENTS

| | | | |
|---|---|---|---|
| 5,267,261 A | 11/1993 | Blakeney, II et al. | |
| 5,530,693 A | 6/1996 | Averbuch et al. | |
| 7,177,297 B2 | 2/2007 | Agrawal et al. | |
| 8,059,608 B2 | 11/2011 | Malladi et al | |
| 8,107,547 B2* | 1/2012 | Muharemovic et al. | ....... 375/260 |
| 8,233,517 B2* | 7/2012 | Grant | ............. 375/144 |
| 2002/0145988 A1* | 10/2002 | Dahlman et al. | ............. 370/335 |
| 2003/0154435 A1* | 8/2003 | Claussen et al. | ............. 714/755 |
| 2006/0229091 A1 | 10/2006 | Rezaiifar et al. | |
| 2007/0076663 A1* | 4/2007 | Qi et al. | ....................... 370/331 |

(Continued)

FOREIGN PATENT DOCUMENTS

| | | |
|---|---|---|
| CN | 1253700 A | 5/2000 |
| EP | 1349410 A2 | 10/2003 |

(Continued)

OTHER PUBLICATIONS

Heesoo Lee et al: "Novel Multi-User MIMO Scheme Based on Successive Interference Cancellation" Jun. 1, 2007, Consumer Electronics, 2007. ISCE 2007. IEEE International Symposium on, IEEE, PI, pp. 1-5 , XP031160370 ISBN: 978-1-4244-1109-2 p. 1, left-hand column, lines 23-29 p. 2, left-hand column, lines 18-29 p. 3, left-hand column, lines 34-50.
International Search Report and Written Opinion—PCT/US2010/024205, International Search Authority—European Patent Office—Oct. 7, 2010.

(Continued)

*Primary Examiner* — Brandon Renner
*Assistant Examiner* — Faisal Choudhury
(74) *Attorney, Agent, or Firm* — Jeffrey Jacobs

(57) ABSTRACT

An apparatus for wireless communication is disclosed that includes a processing system configured to communicate with a plurality of sectors in an active set; and receive independent data streams from the plurality of sectors on the same carrier. A method for performing the process is also disclosed herein.

29 Claims, 7 Drawing Sheets

(56) References Cited

U.S. PATENT DOCUMENTS

| | | |
|---|---|---|
| 2007/0178839 A1* | 8/2007 | Rezvani et al. ............... 455/62 |
| 2008/0049660 A1* | 2/2008 | Kwan et al. .................. 370/318 |
| 2009/0016268 A1* | 1/2009 | Yi et al. ...................... 370/328 |
| 2009/0116389 A1* | 5/2009 | Ji et al. ....................... 370/235 |
| 2009/0221231 A1* | 9/2009 | Weng et al. ................... 455/15 |
| 2009/0275335 A1* | 11/2009 | Jalloul et al. ................ 455/437 |
| 2009/0285174 A1* | 11/2009 | Haga et al. .................. 370/331 |
| 2009/0327835 A1* | 12/2009 | Oteri et al. .................. 714/758 |
| 2010/0040037 A1* | 2/2010 | Choi et al. .................. 370/345 |
| 2010/0290435 A1* | 11/2010 | Kazmi ........................ 370/332 |
| 2011/0286418 A1* | 11/2011 | Liu et al. .................... 370/329 |

FOREIGN PATENT DOCUMENTS

| | | |
|---|---|---|
| EP | 1875624 A2 | 1/2008 |
| TW | 583889 B | 4/2004 |
| TW | 200509578 A | 3/2005 |
| WO | WO9825432 A2 | 6/1998 |
| WO | WO2005060277 | 6/2005 |
| WO | 2006138203 A1 | 12/2006 |

OTHER PUBLICATIONS

Partial International Search Report—PCT/US2010/024205—International Search Authority, European Patent Office, Jul. 16, 2010.

Taiwan Search Report—TW099105061—TIPO—Jun. 26, 2013.

* cited by examiner

METHOD AND APPARATUS FOR INTER-SECTOR MIMO

CROSS-REFERENCE TO RELATED APPLICATIONS

CLAIM OF PRIORITY UNDER 35 U.S.C. §119

The present Application for Patent claims priority to Provisional Application No. 61/152,422, entitled "INTER-SECTOR MIMO" filed Feb. 13, 2009, and assigned to the assignee hereof and hereby expressly incorporated by reference herein.

BACKGROUND

I. Field

The following description relates generally to communication systems, and more particularly to transmission of independent data streams from multiple sectors (or cells) from an access terminal's active set on the same carrier to that access terminal.

II. Background

In data communication systems such as those operable with Evolution-Data Optimized (EV-DO), High Speed Packet Access (HSPA), and Long Term Evolution (LTE) communication standards, typically an Access Terminal (AT) can only receive data from a single sector on a single carrier at any given time. In EV-DO, both multi-carrier capable terminals and enhanced single-carrier terminals are capable of receiving data from multiple sectors at the same time when in soft or softer handoff. Using multi-link radio link protocol (RLP), data can be communicated with multiple sectors simultaneously. The AT may select the subset of sectors from the active set that comprise the multiple sectors for data reception on the FL. However, the AT must be able to receive and decode multiple data streams from the multiple sectors.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to systems and/or methods that provide wireless communications, where a method for wireless communications is provided that includes communicating with a plurality of sectors in an active set; and receiving independent data streams from the plurality of sectors on the same carrier.

In another aspect, an apparatus for wireless communications includes a processing system configured to communicate with a plurality of sectors in an active set; and receive independent data streams from the plurality of sectors on the same carrier.

In yet another aspect, an apparatus for wireless communications is provided that includes means for communicating with a plurality of sectors in an active set; and means for receiving independent data streams from the plurality of sectors on the same carrier.

In yet another aspect, an apparatus for wireless communications is provided that includes means for the terminal to cancel the interference from one of the independent data streams and then decode the independent data stream from another sector. This interference cancellation can be applied successively.

In yet another aspect, a computer-program product for communication is provided that includes a machine-readable medium comprising instructions executable to communicate with a plurality of sectors in an active set; and receive independent data streams from the plurality of sectors on the same carrier.

In yet another aspect, an access terminal is provided that comprises an antenna; a processing system configured to communicate with a plurality of sectors in an active set; and a receiver configured to receive, via the antenna, independent data streams from the plurality of sectors on the same carrier.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

The various aspects of the disclosure are directed to configuring multi-carrier capable terminals or enhanced single-carrier terminals to receive data from multiple sectors on the same carrier at the same time. Using multi-link radio link protocol (RLP), data can be transmitted from multiple sectors simultaneously. In one aspect of the disclosure, this mode of communication can be performed by all sectors in the active set on the carrier in question when the AT is in soft or softer handoff, as further described herein. In another aspect of the disclosure, the AT selects a subset of sectors from its active set for data reception on the forward link. The AT transmits the forward link overhead information that is necessary to communicate with the primary forward link serving sector and also transmits the forward link overhead information necessary to communicate with the additional forward link serving sectors using a reverse link pilot with a different long code mask, basic feedback multiplexing, or enhanced feedback multiplexing.

Further, an AT implementing various aspects of the disclosure during can cancel interference from the one of the serving sectors before demodulating/decoding data from the other serving sector, and so on. In one aspect of the disclosure, the interference cancellation approach is a successive interference cancellation approach and therefore the AT may attempt to cancel interference related to the data from the serving sector with the highest Signal-to-Interference-and-Noise ratio (SINR) before decoding data from the serving sector with the next highest SINR, and so on.

Figure 1:
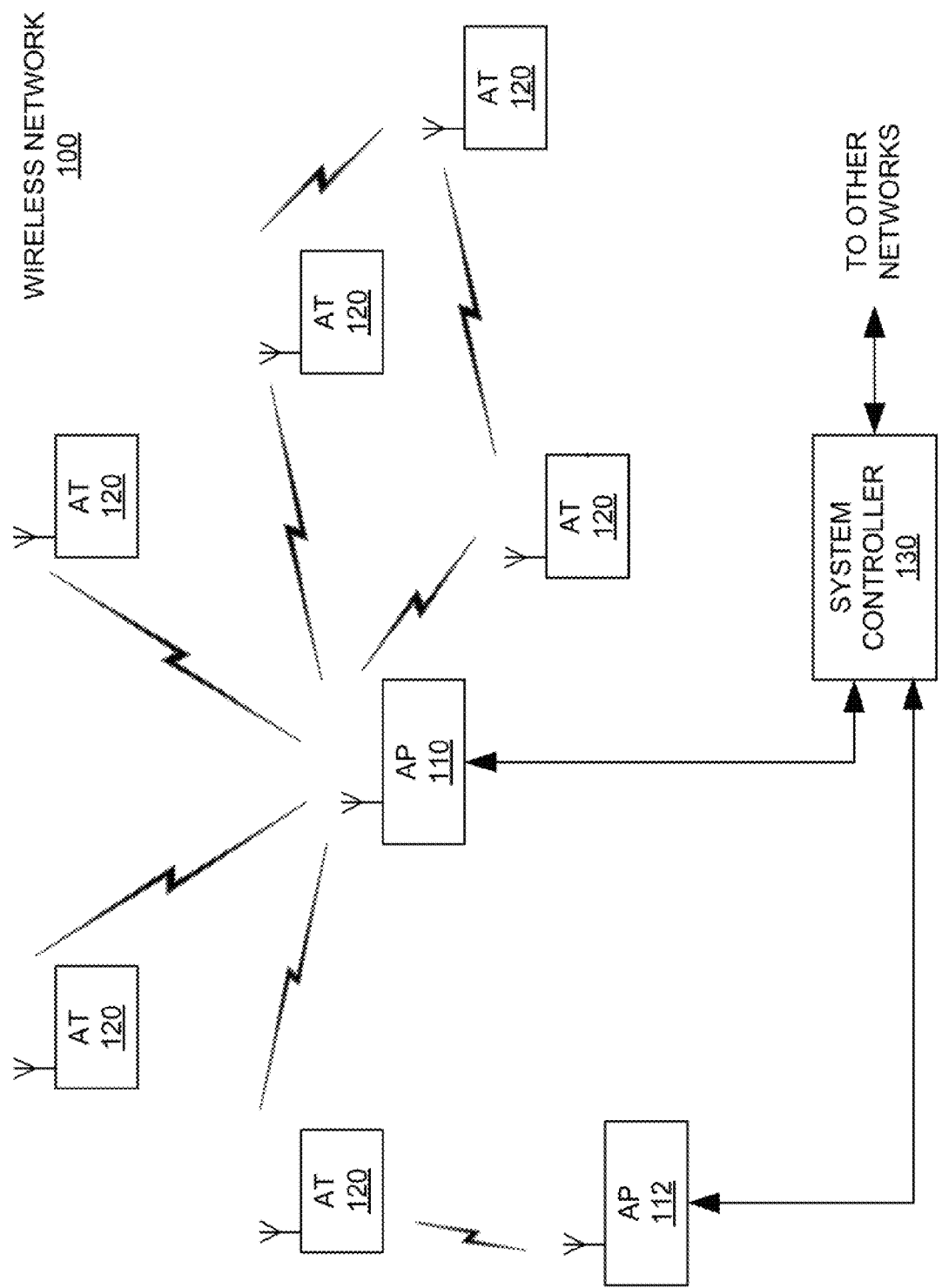
FIG. 1 is a diagram of a wireless communications network configured in accordance with an aspect of the disclosure.

Several aspects of a wireless network in which an AT will now be presented with reference to FIG. 1. The wireless network, which is also referred to herein as a basic service set (BSS) 100 is shown with several wireless nodes, generally designated as an access point 110 and a plurality of ATs or stations (STAs) 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120, where each access point may be part of a sector, where a sector may comprise of one or more access points. One or more sectors can be grouped together into a cell. A system controller 130 such as a radio network controller may be used to provide coordination and control of the access points, as well as access to other networks (e.g., Internet) for the access terminals 120 to manage the cells and the sectors. For example, an access point 110 and an access point 112 are shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

One or more access terminals 120 may be equipped as multi-carrier capable or enhanced single-carrier terminals. With this configuration, for example, the access terminals may be used to communicate with multiple access points to improve data throughput without additional bandwidth or transmit power. This may be achieved by creating a multiple input transmission scheme on the network level.

While portions of the following disclosure will describe access terminals that also support multiple sector communications technology, the access terminals 120 may also be configured to support access points that support MIMO technology. This approach may allow older versions of access points (i.e., "legacy" access points) to remain deployed in a wireless network, extending their useful lifetime, while allowing newer MIMO access terminals to be introduced as appropriate.

In the detailed description that follows, various aspects of the disclosure will be described with reference to a wireless communications system supporting the Third Generation Partnership Project 2 (3GPP2) standard. For example, the reverse link feedback mechanism as further used below is found in 3GPP2 standard, C.S0024-B. Also, the multi-link Radio Link Protocol (RLP) as found in 3GPP2 standard, C.S0063-. is also used, as described below.

Although the 3GPP2 standard has been referenced, various aspects of the disclosure may be used with any suitable wireless technology. Other suitable wireless technologies include, by way of example, Code Division Multiple Access (CDMA)-based HSPA or Wideband-CDMA, and Orthogonal Frequency Division Multiplexing (OFDM)-based LTE. As those skilled in the art will readily appreciate, the various aspects of this disclosure are not limited to any particular wireless technology and/or air interface standard.

Figure 2:
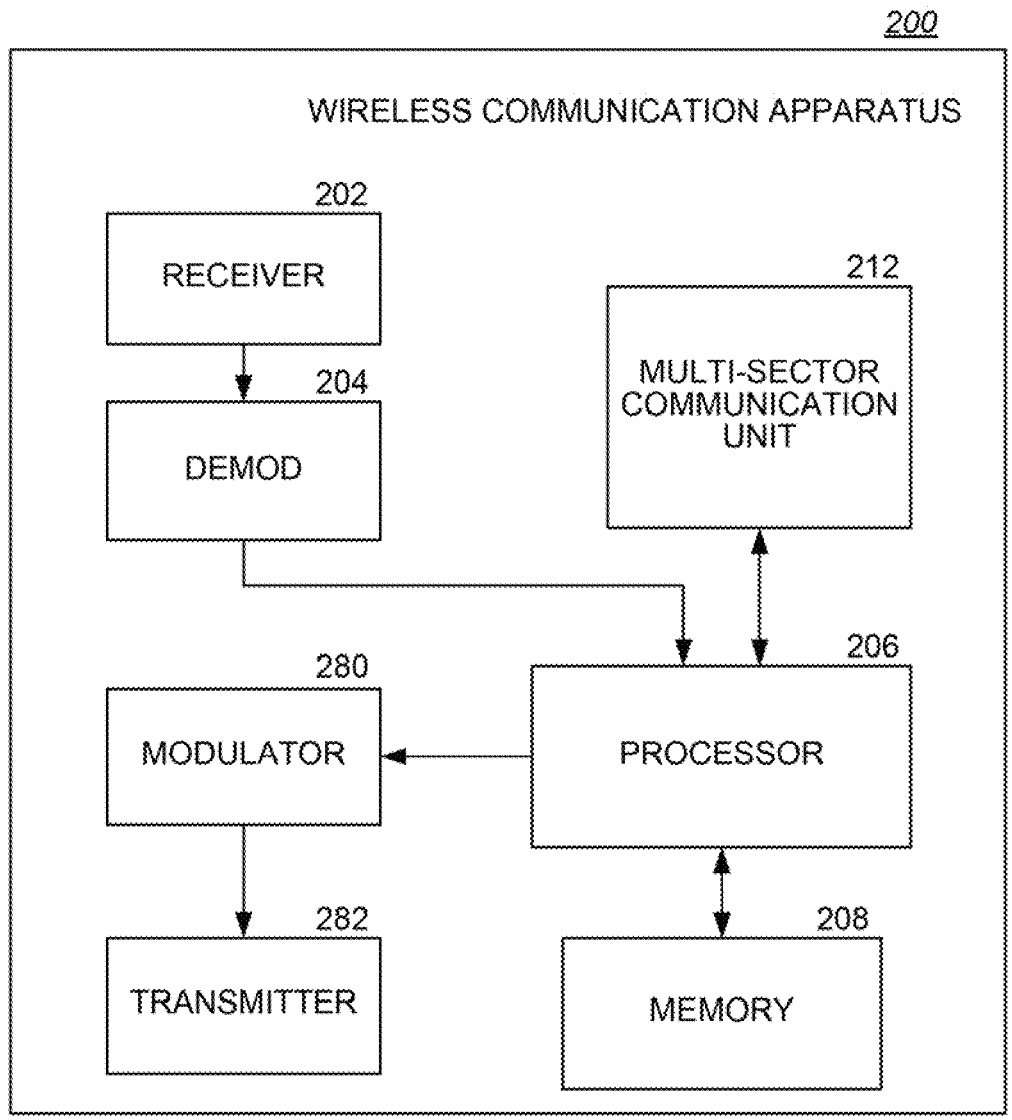
FIG. 2 is a block diagram of a wireless communication apparatus as configured in accordance with an aspect of the disclosure that may be used in the wireless network of FIG. 1.

FIG. 2 is an illustration of a wireless communication apparatus 200 that facilitates receiving and processing messages received over a wireless network such as the wireless network 100 of FIG. 1. The wireless communication apparatus 200 includes a receiver 202 that receives a signal from, for instance, a receive antenna (not shown), performs typical actions on (e.g., filters, amplifies, downconverts, etc.) the received signal, and digitizes the conditioned signal to obtain samples. Receiver 202 then passes the samples to a demodulator 204 that can demodulate received symbols and provide them to a processor 206 for data processing. The processor 206 can be a processor dedicated to analyzing information received by the receiver 202 and/or generating information for transmission by a transmitter 282, a processor that controls one or more components of the wireless communication apparatus 200, and/or a processor that both analyzes information received by the receiver 202, generates information for transmission by the transmitter 282, and controls one or more components of the wireless communication apparatus 200.

The wireless communication apparatus 200 can further comprise a multi-sector communication unit 212 coupled to the processor 206 that allows the wireless communication apparatus 200 to operate with multiple sectors in accordance with one aspect of the disclosure. The wireless communication apparatus 200 still further comprises a modulator 280 and transmitter 282 that respectively modulate and transmit signals to, for instance, another wireless communication apparatus (access terminals, access points, etc.). This can operate as part of a disparate bidirectional wireless network utilized to communicate information. Although depicted as being separate from the processor 206, it is to be appreciated that the multi-sector communication unit 212, demodulator 204, and/or modulator 280 can be part of the processor 206 or multiple processors (not shown).

The wireless communication apparatus 200 can additionally comprise a memory 208 that is operatively coupled to the processor 206 and that can store data to be transmitted, received data, information related to available channels, data associated with analyzed signal and/or interference strength, information related to an assigned channel, power, rate, or the like, and any other suitable information for estimating a channel and communicating via the channel. The memory 208 can additionally store protocols and/or algorithms associated with estimating and/or utilizing a channel (e.g., performance based, capacity based, etc.) as well as operating with multiples sectors.

It will be appreciated that the data store (e.g., the memory 208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 of the subject apparatus and methods is intended to comprise, without being limited to, these and any other suitable types of memory.

In a traditional data optimized forward link, packet data is transmitted on the forward link over a shared packet data channel referred to as a Forward Traffic Channel (FTC). Packet data transmissions to different users are time multiplexed and transmitted at full power. Only one user in a sector receives transmissions from the access network at a time. Due to the complexity of coordinating packet data transmissions between sectors, soft handoff is not used on the FTC channel. Instead, a process known as sector selection or sector switching is used. The AT monitors the signal power from all sectors in its active set and selects the sector that provides the strongest signal as the serving sector. As the AT moves away from the serving sector toward a non-serving sector, the signal strength from the serving sector will diminish while the signal strength from the non-serving sector will increase. When the signal strength from a candidate sector in the AT's active set exceeds the signal strength from the serving sector by a predetermined amount, the AT sends a signal to switch sectors.

Thus, traditionally each AT requests data from a maximum of one (1) sector per carrier, with the sector and the carrier being found in the AT's active set. The sectors are selected based on quality, with no consideration of other factors. For example, there is typically no consideration of the load of the sector being considered for the serving sector. The emphasis has been on establishing communications based on an achievable quality of communications between the AT and a sector (i.e., one or more access points) versus factors that may affect an overall throughput between the AT and a sector. However, it may be more preferable for the AT to establish communications based on factors other than just quality.

Figure 3:
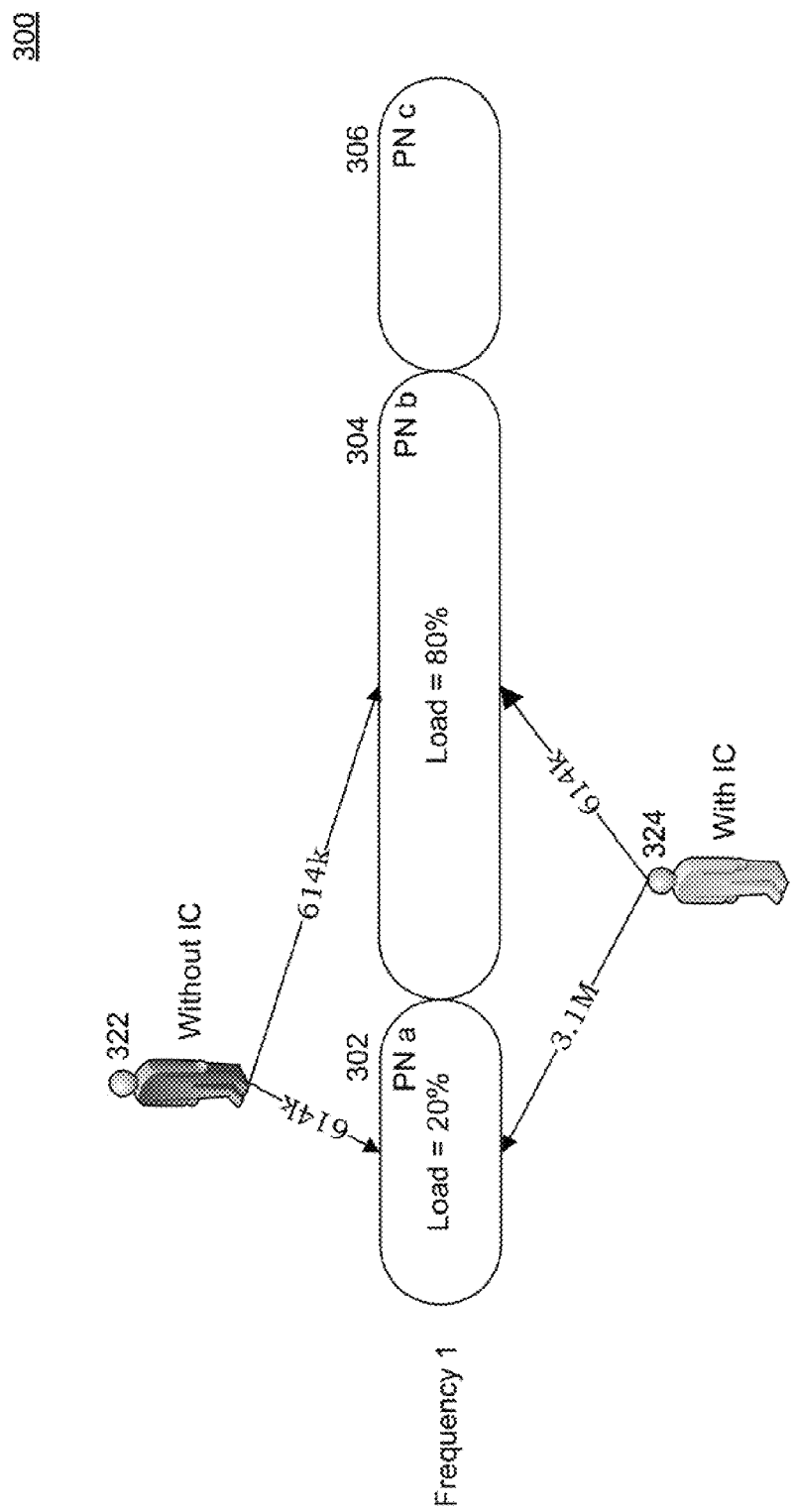
FIG. 3 is a diagram of two ATs operating with multiple sectors configured in accordance with one aspect of the disclosure.

In one aspect of the disclosure, as illustrated by FIG. 3, an AT 322 will request and receive data on the same carrier (Frequency 1) from multiple sectors 302, 304 within the active set, as differentiated from a multi-link RLP scheme where an AT can connect to multiple carriers in the same or different sectors from the active set but limited to one data stream per carrier from any sector in the active set. The AT 322 may perform this during normal communications or when in soft or softer handoffs; where a soft handoff refers to a handoff of an AT between sectors in same cell, and a softer handoff refers to a handoff between cells. Through the use of different pseudorandom number sequences a, b, and c, each sector 302, 304 and 306 are able to transmit an independent data stream for the AT 322. Thus, the AT 322 does not soft combine data from the sectors 302, 304 as each of the data streams on the same carrier the AT 322 has requested and received from each sector is an independent data stream, with different data contained in each of the streams.

As the AT initiates data transmissions, the AT selects the sectors with which the AT will establish communications. All sectors are chosen from an active set, which are collectively referred to as a data transmitting subset. The data transmitting subset may only include up to and include all of the sectors in the active set. In one aspect of the disclosure, to implement the system disclosed herein the AT will need to transmit the forward link overhead information to any additional sectors with which the AT will communicate. The forward link overhead information may include the DRC, DSC, and ACK channels, which are the minimal required channels necessary for forward link operation. The AT may transmit the forward link overhead information using a variety of approaches. For example, the AT may transmit the forward link overhead information using an additional reverse link pilot using an additional long code mask. The AT also may transmit the forward link overhead information using basic feedback multiplexing. The AT further also may transmit the forward link overhead information using enhanced feedback multiplexing. The AT will transmit the forward link overhead information using a different long code mask for each of the additional sectors.

Using multi-link RLP for communication between the AT and multiple sectors in the active set using the same carrier, the simultaneous transmission from the sectors that are in the ATs active set may be enabled by many approaches. For example, the simultaneous transmission may be achieved through scheduler coordination. In another approach, the simultaneous transmissions may be achieved through joint scheduling across the sectors of the cell, in which a cell-based scheduler is used to coordinate the simultaneous transmissions.

In another aspect of the disclosure, when the AT is operating during a softer-handoff situation, the serving sectors from the cell can transmit simultaneously; allowing the AT to cancel interference from one serving sector before demodulating and decoding data from another serving sector. Referring again to FIG. 3, an AT 324 implements interference cancellation (IC) using its communication with the sector 304 to allow interference cancellation for its communication with the sector 302 to achieve a higher data rate.

Figure 4:
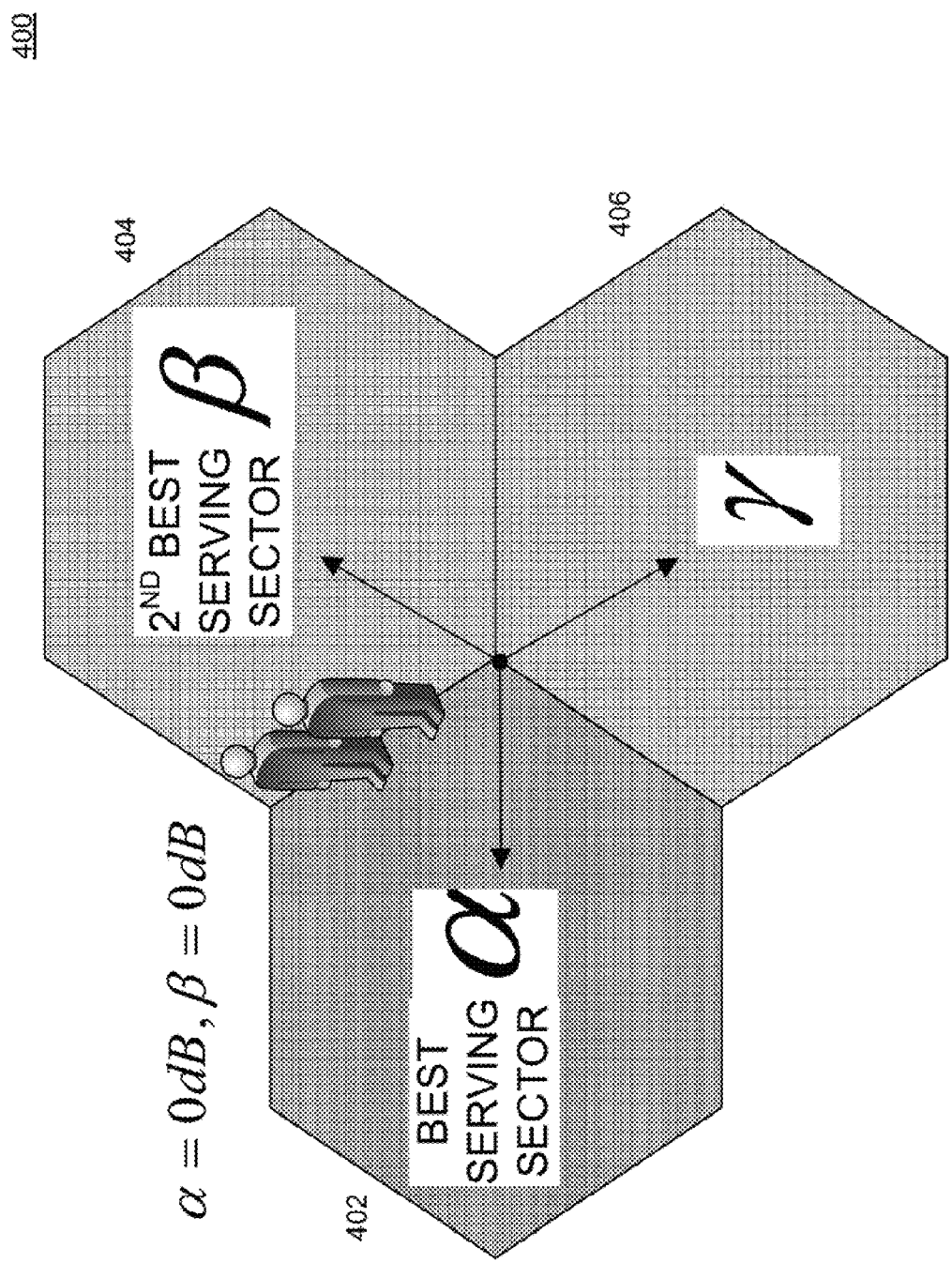
FIG. 4 is a network diagram of an AT configured in accordance with one aspect of the disclosure operating with multiple sectors.
Figure 5:
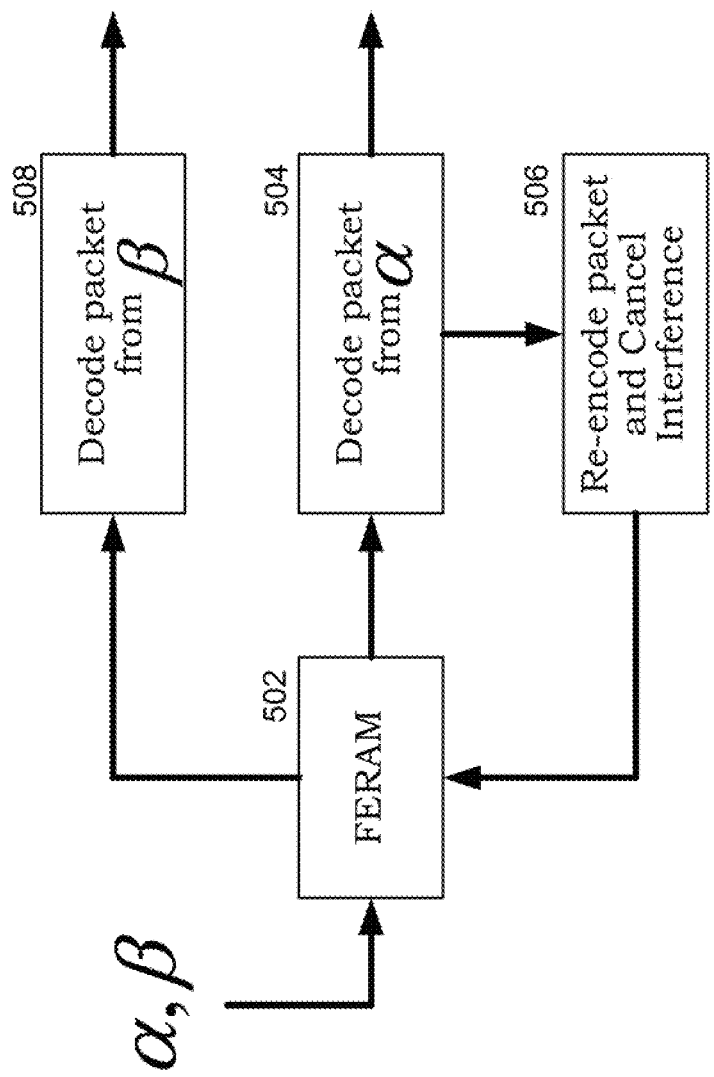
FIG. 5 is a flow diagram illustrating the operation of the AT of FIG. 4 configured in accordance with an aspect of the disclosure.

Referring to FIGS. 4 and 5, which illustrates an interference cancellation (IC) approach 500 for an AT operating between a first serving sector α402 and a second serving sector β404 where, in a step 502, a Front End Random Access Memory (FERAM) unit is where received samples are stored in step 504 so that demodulation and decode operations may be performed by other functional blocks in the receiver. In one aspect of the disclosure, the first serving sector α402 in step 504 is the best serving sector and the AT will decode the data stream from this most preferred serving sector before decoding the data stream from next most preferred serving sector. The order of iteration of data streams are from a most to least preferred order. In one aspect of the disclosure, the most to least preferred order of iteration of the data stream selection process is defined to be from best to worst quality of data streams, as defined by a signal to interference-plus-noise ratio. In another aspect of the disclosure, the most to least preferred order of iteration of data streams during the data stream selection process is defined to be the base stations with the lowest to highest loads. In step 506, interference from the first serving sector α402 is removed from all other data streams, including those from a second serving sector β404. Then, in step 508, the data stream from the second serving sector β404 is decoded. The interference from the data stream from the second serving sector β404 is also removed from other data streams as well. Successive interference cancellation may be implemented, as described herein.

Figure 6:
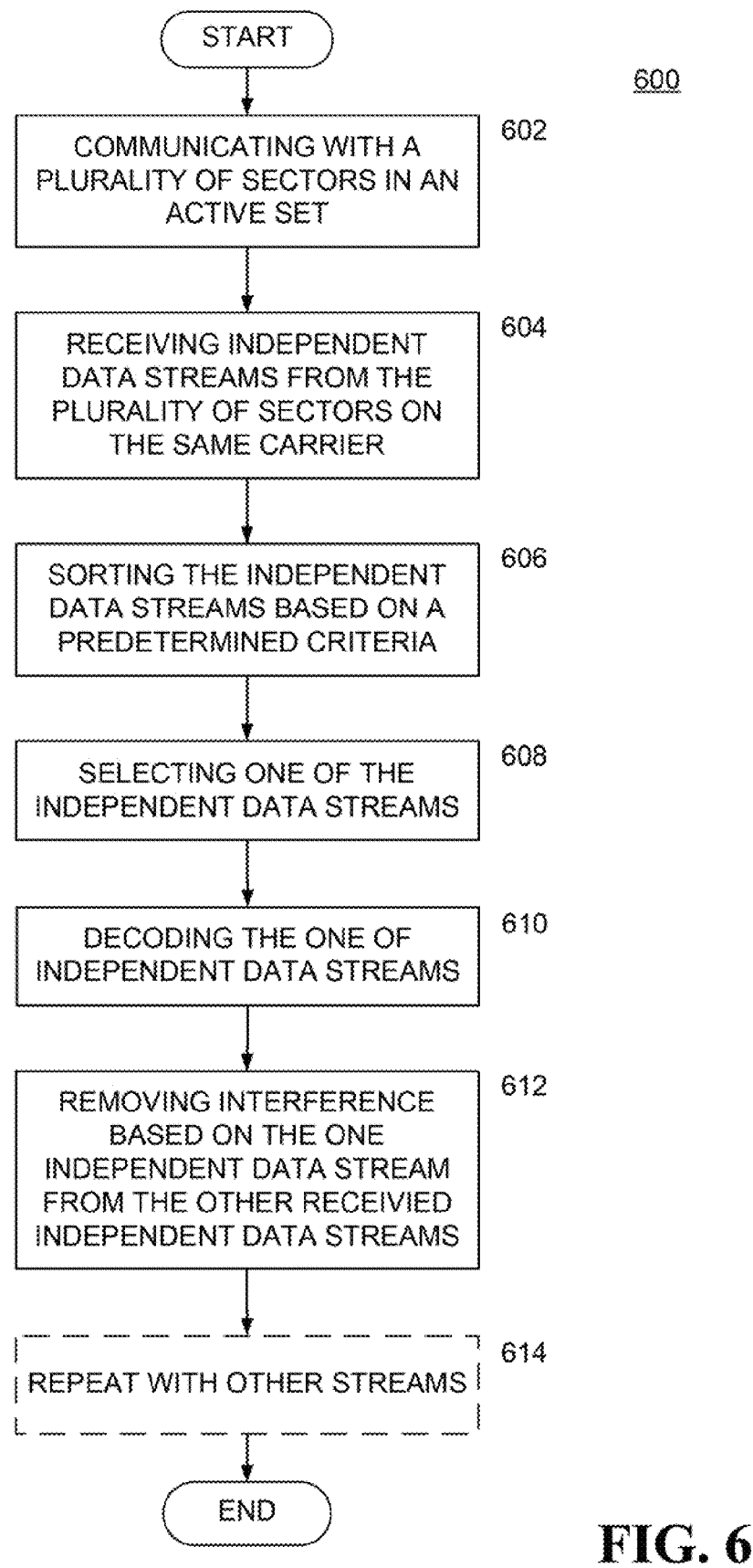
FIG. 6 is a second flow diagram illustrating the operation of the AT of FIG. 4 configured in accordance with another aspect of the disclosure.

FIG. 6 is a flow diagram illustrating a generalized successive cancellation approach 600 for an AT implementing various aspects of the disclosure for canceling interference from one of the serving sectors before demodulating/decoding data from another serving sector, and so on. In one aspect of the disclosure, the interference cancellation approach is a successive interference cancellation approach. Specifically, the AT attempts to cancel interference related to the data from the serving sector with the highest Signal-to-Interference-and-Noise ratio (SINR) before decoding data from the serving sector with the next highest SINR, and so on. In step 602, the AT communicates with a plurality of sectors in an active set. In one aspect of the disclosure, the sectors in the active set are chosen based on a determined forward link quality, which may be determined using a signal to interference-plus-noise ratio or a loading of the plurality of sectors. In step 604, the AT receives independent data streams from the plurality of sectors on the same carrier. In step 606, the AT sorts the independent data streams based on a predetermined criteria. In step 608, the AT selects one of the independent data streams. In step 610, the AT decodes one of independent data streams. In step 612, the AT removes interference based on the one independent data stream decoded in step 610, from the other received independent data streams. In step 614, the AT may repeat the process with other data streams.

Figure 7:
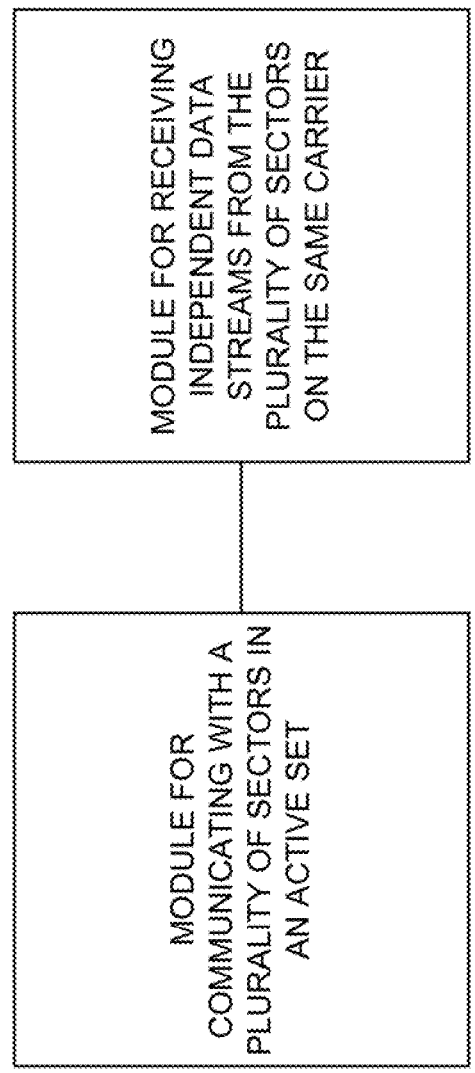
FIG. 7 is a block diagram illustrating the functionality of an apparatus for returning channel information in accordance with one aspect of the disclosure.

FIG. 7 is a diagram illustrating the functionality of an apparatus 700 in accordance with one aspect of the disclosure. The apparatus 700 includes a module 702 for communicating with a plurality of sectors in an active set; and a module 704 for receiving independent data streams from the plurality of sectors on the same carrier.

Those of skill will appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications, the method comprising:
   communicating with a plurality of sectors in an active set;
   receiving independent data streams from the plurality of sectors on the same carrier;
   sorting the independent data streams based on a load of the sector of the plurality of sectors from which the respective independent data stream was received;
   removing interference based on a first independent data stream selected from the received independent data streams, the interference removed from the other received independent data streams to create a first iteration of processed received data streams;
   removing interference based on a second independent data stream selected from the first iteration of processed received data streams, the interference removed from the first iteration of processed received data streams to create a second iteration of processed received data streams;
   decoding the first independent data stream prior to removing interference from the other received data streams; and
   decoding the second independent data stream prior to removing interference from the first iteration of processed received data streams,
   wherein the first independent data stream is received from the sector of the plurality of sectors having the lowest load.

2. The method of claim 1, further comprising:
   receiving independent data streams from a second carrier.

3. The method of claim 1, further comprising
   selecting a third independent data stream from the second iteration of processed received data streams;
   decoding the third independent data stream; and removing interference based on the third independent data stream from the second iteration of processed received data streams to create a third iteration of processed received data streams.

4. The method of claim 1, wherein the independent data streams are in the forward link from the base station to the mobile station.

5. The method of claim 1, wherein the communication with the plurality of sectors in the active set is compliant with a multilink Radio Link Protocol (RLP).

6. The method of claim 1, further comprising:
sending a second reverse link feedback for a second sector.

7. The method of claim 6, wherein the second reverse link feedback comprises at least one of: another pilot, another DRC, another DSC, and another acknowledgment message transmitted using an additional long code mask for communicating with the second sector.

8. The method of claim 6, wherein the second reverse link feedback is a basic feedback multiplexing, as compliant with EVDO Rev-B.

9. The method of claim 6, wherein the second reverse link feedback is an enhanced feedback multiplexing, as compliant with enhanced EVDO Rev-B.

10. An apparatus for wireless communications, comprising:
a memory comprising a set of instructions stored therein;
a processing system configured to execute the set of instructions to:
communicate with a plurality of sectors in an active set;
receive independent data streams from the plurality of sectors on the same carrier;
sort the independent data streams based on a load of the sector of the plurality of sectors from which the respective independent data stream was received;
remove interference based on a first independent data stream selected from the received independent data streams, the interference removed from the other received independent data streams to create a first iteration of processed received data streams;
remove interference based on a second independent data stream selected from the first iteration of processed received data streams, the interference removed from the first iteration of processed received data streams to create a second iteration of processed received data streams;
decode the first independent data stream prior to removing interference from the other received data streams; and
decode the second independent data stream prior to removing interference from the first iteration of processed received data streams,
wherein the first independent data stream is from the sector of the plurality of sectors having the lowest load.

11. The apparatus of claim 10, wherein the processing system is further configured to:
receive independent data streams from a second carrier.

12. The apparatus of claim 10, wherein the processing system is configured to:
select a third independent data stream from the second iteration of processed received data streams;
decode the third independent data stream; and
remove interference based on the third independent data stream from the second iteration of processed received data streams to create a third iteration of processed received data streams.

13. The apparatus of claim 10, wherein the independent data streams are in the forward link from the base station to the mobile station.

14. The apparatus of claim 10, wherein the communication with the plurality of sectors in the active set is compliant with a multilink Radio Link Protocol (RLP).

15. The apparatus of claim 10, wherein the processing system is further configured to:
send a second reverse link feedback for a second sector.

16. The apparatus of claim 15, wherein the second reverse link feedback comprises at least one of: another pilot, another DRC, another DSC, and another acknowledgment message transmitted using an additional long code mask for communicating with the second sector.

17. The apparatus of claim 15, wherein the second reverse link feedback is a basic feedback multiplexing, as compliant with EVDO Rev-B.

18. The apparatus of claim 15, wherein the second reverse link feedback is an enhanced feedback multiplexing, as compliant with enhanced EVDO Rev-B.

19. An apparatus for wireless communications comprising:
a processor configured to provide:
means for communicating with a plurality of sectors in an active set;
means for receiving independent data streams from the plurality of sectors on the same carrier;
means for sorting the independent data streams based on a load of the sector of the plurality of sectors from which the respective independent data stream was received;
means for removing interference based on a first independent data stream selected from the received independent data streams, the interference removed from the other received independent data streams to create a first iteration of processed received data streams;
means for removing interference based on a second independent data stream selected from the first iteration of processed received data streams, the interference removed from the first iteration of processed received data streams to create a second iteration of processed received data streams;
means for decoding the first independent data stream prior to removing interference from the other received data streams; and
means for decoding the second independent data stream prior to removing interference from the first iteration of processed received data streams,
wherein the first independent data stream is from the sector of the plurality of sectors having the lowest load.

20. The apparatus of claim 19, further comprising:
means for receiving independent data streams from a second carrier.

21. The apparatus of claim 19, further comprising
means for selecting a third independent data stream from the second iteration of processed received data streams;
means for decoding the third independent data stream; and
means for removing interference based on the third independent data stream from the second iteration of processed received data streams to create a third iteration of processed received data streams.

22. The apparatus of claim 19, wherein the independent data streams are in the forward link from the base station to the mobile station.

23. The apparatus of claim 19, wherein the communication with the plurality of sectors in the active set is compliant with a multilink Radio Link Protocol (RLP).

24. The apparatus of claim 19, further comprising:
means for sending a second reverse link feedback for a second sector.

25. The apparatus of claim 24, wherein the second reverse link feedback comprises at least one of: another pilot, another DRC, another DSC, and another acknowledgment message transmitted using an additional long code mask for communicating with the second sector.

26. The apparatus of claim 24, wherein the second reverse link feedback is a basic feedback multiplexing, as compliant with EVDO Rev-B.

27. The apparatus of claim 24, wherein the second reverse link feedback is an enhanced feedback multiplexing, as compliant with enhanced EVDO Rev-B.

28. A computer-program product for communication, comprising:
a non-transitory machine-readable medium comprising instructions executable to:
communicate with a plurality of sectors in an active set;
receive independent data streams from the plurality of sectors on the same carrier;
sort the independent data streams based on a load of the sector of the plurality of sectors from which the respective independent data stream was received;
remove interference based on a first independent data stream selected from the received independent data streams, the interference removed from the other received independent data streams to create a first iteration of processed received data streams;
remove interference based on a second independent data stream selected from the first iteration of processed received data streams, the interference removed from the first iteration of processed received data streams to create a second iteration of processed received data stream;
decode the first independent data stream prior to removing interference from the other received data streams; and
decode the second independent data stream prior to removing interference from the first iteration of processed received data streams,
wherein the first independent data stream is from the sector of the plurality of sectors having the lowest load.

29. An access terminal, comprising:
an antenna;
a processing system configured to communicate with a plurality of sectors in an active set; and
a receiver coupled to the processing system and the antenna, and configured to:
receive, via the antenna, independent data streams from the plurality of sectors on the same carrier;
sort the independent data streams based on a load of the sector of the plurality of sectors from which the respective independent data stream was received;
remove interference based on a first independent data stream selected from the received independent data streams, the interference removed from the other received independent data streams to create a first iteration of processed received data streams;
remove interference based on a second independent data stream selected from the first iteration of processed received data streams, the interference removed from the first iteration of processed received data streams to create a second iteration of processed received data streams;
decode the first independent data stream prior to removing interference from the other received data streams; and
decode the second independent data stream prior to removing interference from the first iteration of processed received data streams,
wherein the first independent data stream is from the sector of the plurality of sectors having the lowest load.

\* \* \* \* \*